United States Patent Office 3,099,674
Patented July 30, 1963

---

3,099,674
THIOPHOSPHONIC ACID ESTER AMIDES
Gerhard Schrader, Wuppertal-Cronenberg, Germany, assignor to Farbenfabriken Bayer Aktiengesellschaft, Leverkusen, Germany, a corporation of Germany
No Drawing. Filed Apr. 13, 1960, Ser. No. 21,899
Claims priority, application Germany Apr. 16, 1959
8 Claims. (Cl. 260—461)

The present invention relates to and has as its objects new and useful thiophosphonic acid ester derivatives and processes for their production. The new insecticidally active compounds of this invention may be represented by the following general formula

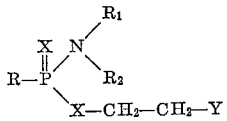

in which R stands for aliphatic or aromatic radicals, $R_1$ and $R_2$ stand for aliphatic radicals, possibly being cyclized to form a nitrogen-containing ring system, X being oxygen or sulfur, one X being sulfur, and Y stands for an alkyl mercapto or dialkylamino group.

Alkyl-phosphonic acid-amide chlorides or alkyl-thionophosphonic acid-amide chlorides are known in the literature (cf. inter alia B. A. Arbusow, N. I. Rizpolozhenski and N. A. Svereva, Izvest. Akad. SSSR (1955), 1021–1030).

It has now been found that these chlorides may be used for the production of compounds having a high insecticidal activity. For this purpose, either alkyl-thionophosphonic acid-amide chlorides are reacted with β-hydroxy-ethyl-thioalkyl ethers or with β-hydroxy-ethyl dialkylamines, or alkyl-phosphonic acid-amide chlorides are reacted with β-ethylmercapto-thioalkyl ethers or with β-ethylmercapto-dialkylamines. In this way compounds of the above shown formula are obtained.

More specifically in the following formula

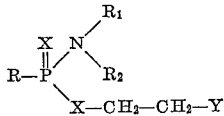

R stands for a lower aliphatic or cyclo-aliphatic radical up to 8 carbon atoms, $R_1$ and $R_2$ stand for lower aliphatic radicals up to 4 carbon atoms,

possibly being a piperidine, piperazine, morpholine, thiomorpholine, or pyrrolidine radical, and Y stands for a lower alkyl mercapto or lower dialkyl amino group. The conditions for the group X are the same as given above.

The reaction described more above may be shown by the following equations:

(A)
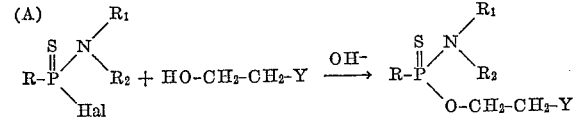

(B)
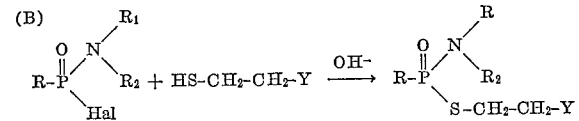

The above shown reaction (A) preferably is carried out in inert organic solvents such as alcohols, lower aliphatic ketones, benzene, toluene and the like, and at slightly elevated temperatures of up to 100° C., preferably just below the boiling point of the solvent used.

The reaction under (B) is also carried out in inert organic solvents. In this case especially benzene or toluene are used as such solvents, the reaction temperature being usually somewhat lower than described for the reaction under (A). Both reactions are carried out either by using acid-binding agents or by using in case of (B) the alkali metal salts of the mercaptans.

The new compounds of the present invention very effectively kill insects like flies, mites, aphids etc. They distinguish themselves especially by a good contact-insecticidal activity and at the same time by an activity on eating insects such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

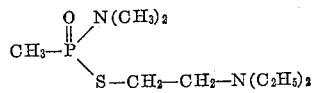

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out as follows:

(a) Against aphids of the type Doralis fabae: Heavily infested bean plants (Vicia faba) have been sprayed drip wet with solutions as prepared above in a concentration of 0.01%. The effect has been determined after 24 hours by counting the dead pests either on the surface of the soil or still remaining on the plants: 100% killing has been obtained.

(b) Against spider mites: Bean plants (Phaseolus vulgaris) of about 15 inches height are sprayed drip wet with solutions prepared as indicated above and in a concentration of 0.001%. The bean plants have been infested heavily with the two-spotted spider (species Tetranychus telarius). Evaluation has been carried out after 24 hours, 48 hours and 8 days: 100% killing has been obtained.

The following examples are given for the purpose of illustrating the present invention, without, however, limiting it in any way.

Example 1

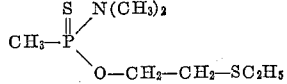

40 grams (0.25 mol) of methyl-thionophosphonic acid dimethylamide chloride (B.P. 65° C./1 mm. Hg) are added at 80° C. with stirring to a suspension of 40 grams of powdered dry potassium carbonate, 28 grams of β-hydroxy-ethyl-thioethyl ether and 150 cc. of methyl ethyl ketone. The mixture is kept at 80° C. for one hour, then cooled to room temperature and the separated salts are filtered off with suction. The filtrate is taken up in 200 cc. of chloroform, washed neutral with water, dried and subsequently fractionated. 43 grams of the new ester of B.P. 79° C./0.01 mm. Hg are thus obtained. Yield 76% of the theoretical. On rats per os toxicity 25 mg./kg. $LD_{50}$. Systemic action on aphids is 100% with 0.1% solutions.

By exactly the same way there may be obtained the compounds of the following formulae:

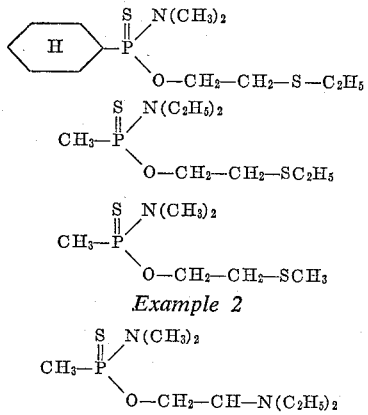

*Example 2*

$$CH_3-\underset{\underset{O-CH_2-CH-N(C_2H_5)_2}{|}}{\overset{\overset{S}{\|}}{P}}-N(CH_3)_2$$

6 grams (0.25 mol) of powdered sodium are suspended in 100 cc. of benzene; 60 grams of β-hydroxy-ethyl-diethyl amine are added at 50° C. with stirring. The mixture is kept at 50° C. for one hour and 40 grams of methyl-thionophosphonic acid dimethylamide chloride are then added with further stirring at 50° C. The reaction product is kept at 50° C. for a further hour and then worked up in conventional manner. 44 grams of the new ester of B.P. 84° C./0.01 mm. Hg are thus obtained. Yield 74% of the theoretical. On rats per os toxicity 50 mg./kg. $LD_{50}$. Spider mites are killed to 60% with 0.01% solutions and to 100% with 0.1% solutions. The compound possesses an ovicidal action.

By the same way there may be obtained the following compounds:

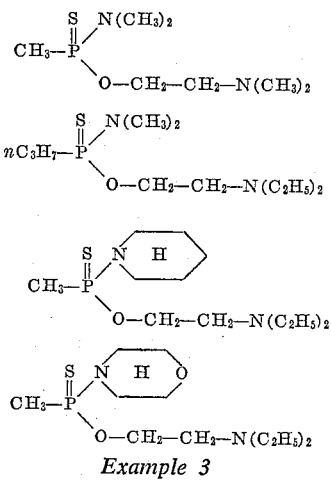

*Example 3*

$$C_2H_5-\underset{\underset{S-CH_2-CH_2-SC_2H_5}{|}}{\overset{\overset{O}{\|}}{P}}-N(CH_3)_2$$

6 grams (0.25 mol) of powdered sodium are suspended in 100 cc. of benzene. 33 grams of β-mercapto-ethyl-thioethyl ether are added with stirring. The mixture is warmed to 40° C. for one hour and the mercaptan is then converted into the sodium salt. 39 grams of ethyl-phosphonic acid dimethylamide chloride (B.P. 75° C./1 mm. Hg) are then added with further stirring. The product is warmed to 50° C. for an hour and then worked up in conventional manner. 48 grams of the new ester of B.P. 88° C./0.01 mm. Hg are thus obtained. Yield 80% of the theoretical. Aphids and spider mites are killed completely with 0.01% solutions. Systemic action on aphids with 0.1% solutions 100%. The compound has an ovicidal action.

By the same way there may be obtained the following compounds:

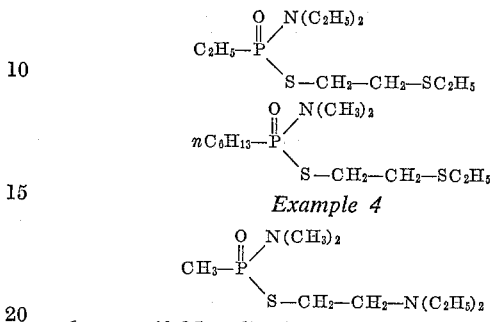

*Example 4*

$$CH_3-\underset{\underset{S-CH_2-CH_2-N(C_2H_5)_2}{|}}{\overset{\overset{O}{\|}}{P}}-N(CH_3)_2$$

6 grams (0.25 mol) of powdered sodium are suspended in 100 cc. of benzene. 34 grams of β-mercapto-ethyl-diethylamine are added with stirring. The mixture is warmed to 30° C. for an hour, thus obtaining the sodium salt of the mercaptan. 35.5 grams of methyl-phosphonic acid dimethyl amide chloride (B.P. 660° C./mm. Hg) are then added with further stirring. Heating is continued to 40° C. for a further hour and the mixture then worked up in conventional manner. 40 grams of the new ester of B.P. 86° C./0.01 mm. Hg are thus obtained. Yield 68% of the theoretical. Aphids are killed completely with 0.01% solutions, spider mites are killed completely with 0.001% solutions and caterpillars are killed completely with 0.1% solutions. Systemic action on aphids with 0.1% solutions 100%.

By the same way there may be otbained the following compound:

$$(CH_3)_2C=CH-\underset{\underset{S-CH_2-CH_2-N(C_2H_5)_2}{|}}{\overset{\overset{O}{\|}}{P}}-N(CH_3)_2$$

*Example 5*

$$CH_3-\underset{\underset{S-CH_2-CH_2-SC_2H_5}{|}}{\overset{\overset{O}{\|}}{P}}-N(CH_3)_2$$

6 grams of powdered sodium are suspended in 100 cc. of benzene. 33 grams of β-mercapto-ethyl-thioethyl ether are added with stirring. By warming the mixture to 30° C. for one hour, the sodium salt of the mercaptan is obtained. 35 grams of methyl-phosphonic acid dimethylamide chloride are added with stirring, the reaction product is kept at 40° C. for one hour and subsequently worked up in conventional manner. 34 grams of the new ester of B.P. 79° C./0.01 mm. Hg are thus obtained. Yield 60° of the theoretical.

I claim:

1. The compound of the following formula

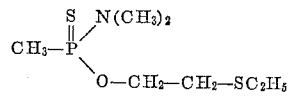

2. The compound of the following formula

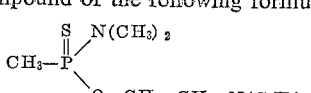

3. The compound of the following formula

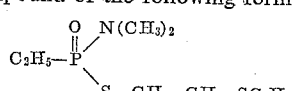

4. The compound of the following formula

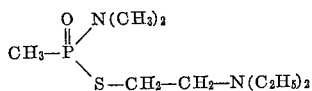

5. The compound of the following formula

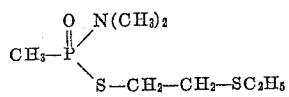

6. A thiophosphonic acid ester amide of the general formula

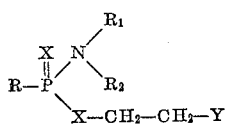

wherein R stands for a member selected from the group consisting of lower alkyl radicals, lower alkenyl radicals and cycloalkyl radicals having up to 8 carbon atoms, $R_1$ and $R_2$ each stand for a lower alkyl radical and when taken together with $-N<$ stand for a member selected from the group consisting of piperidino, piperazino, morpholino, thiomorpholino and pyrrolidino; X stands for a member selected from the group consisting of sulfur and oxygen, one X being sulfur, and Y stands for a member selected from the group consisting of lower alkyl mercapto and lower dialkyl amino groups.

7. A thiophosphonic acid ester amide of claim 6 wherein R, $R_1$ and $R_2$ each stand for a lower alkyl radical and Y stands for a lower alkyl mercapto group.

8. A thiophosphonic acid ester amide of claim 6 wherein R, $R_1$ and $R_2$ each stand for a lower alkyl radical and Y stands for a lower dialkyl amino group.

References Cited in the file of this patent
UNITED STATES PATENTS
2,881,201    Schrader _____ Apr. 7, 1959